United States Patent [19]

Kawai et al.

[11] Patent Number: 4,601,087

[45] Date of Patent: Jul. 22, 1986

[54] METHOD FOR CLADDING INTERIOR SURFACES WITH EXTERNALLY PREFABRICATED CLADDING MATERIAL

[75] Inventors: Nobuyasu Kawai, Kobe; Kunihiko Tsuji, Sioya Kitamachi; Kohichi Beppu, Hyogo, all of Japan

[73] Assignee: Kabushiki Kaisha Kobe Seiko Sho, Kobe, Japan

[21] Appl. No.: 629,513

[22] Filed: Jul. 10, 1984

[30] Foreign Application Priority Data

Jul. 15, 1983 [JP]  Japan .................... 58-128767

[51] Int. Cl.$^4$ .................... B21D 53/00; B21D 39/06; F16K 27/00; B23K 20/14
[52] U.S. Cl. .................... 29/157.1 R; 29/282; 29/428; 137/375; 138/143; 228/186; 228/193; 228/243; 251/366; 285/55
[58] Field of Search .......... 29/157.1 R, 157 R, 157 A, 29/157 T, 235, 237, 282, 402.16, 428; 137/375; 138/97, 141, 143; 228/119, 186, 193, 173.2, 243; 251/366; 285/55

[56] References Cited

U.S. PATENT DOCUMENTS

| | | | |
|---|---|---|---|
| 520,988 | 6/1894 | Harrington | 29/157 R X |
| 1,596,114 | 8/1926 | Murray | 285/55 |
| 1,800,251 | 4/1931 | Fox | 137/375 |
| 1,998,882 | 4/1935 | Merrill | 137/375 |
| 2,216,033 | 9/1940 | Hopkins | 285/55 X |
| 2,308,307 | 1/1943 | Robinson | 285/55 X |
| 2,975,259 | 3/1961 | Osborn, Jr. | 228/186 X |
| 3,918,623 | 11/1975 | Ishiguro et al. | 228/193 X |
| 4,477,955 | 10/1984 | Becker et al. | 29/157.1 R |
| 4,544,523 | 10/1985 | McCollough et al. | 29/156.7 R X |

OTHER PUBLICATIONS

*Metals Handbook*, 8th Edition; vol. 1, Properties and Selection of Metals; American Society for Metals, Metals Park, Ohio (1977); p. 8, "clad metal".
*American Foundrymen's Society Metalcasting Dictionary*; American Foundrymen's Society, Des Plaines, Illinois (1968); p. 43, "cladding".
*Glossary of Chemical Terms*, Second Edition; Van Nostrand Reinhold Company Inc., New York, New York (1982); p. 66, "cladding".
Cameron; *Cam Clad Valve;* Technical Publications, Cameron Iron Works Inc., Houston, Texas (1980); pp. 1-6 and FIG. 19.

*Primary Examiner*—Howard N. Goldberg
*Assistant Examiner*—Ronald S. Wallace
*Attorney, Agent, or Firm*—Oblon, Fisher, Spivak, McClelland & Maier

[57] ABSTRACT

A method for cladding a corrosion resistant high alloy material on surfaces of crossed cavities in a vessel of a high strength metallic material forming a valve casing or the like, the method including the steps of prefabricating first and second cladding structures of generally tubular shapes conforming with the crossed cavities from a thin sheet of a high alloy material; providing grooves on the surfaces of the crossed cavities for receiving corner members of a high alloy material to be located at joined corners of the first and second cladding structures at the intersection of the crossed cavities and end members of a high alloy material to be fitted on end portions of the cladding structures; assembling the first and second cladding structures, corner members and end rings into the crossed cavities; sealing the contacting surfaces of the assembled parts by welding the end members to the vessel and cladding structures; coalescing the assembled parts and the vessel by applying a high pressure to the cladding structures at a high temperature; and removing overlapped portions of the coalesced cladding structures at the intersection of the crossed cavities to communicate the latter with each other.

7 Claims, 8 Drawing Figures

METHOD FOR CLADDING INTERIOR SURFACES WITH EXTERNALLY PREFABRICATED CLADDING MATERIAL

BACKGROUND OF THE INVENTION

1. Field of the Invention

This invention relates to a method for cladding a corrosion resistant high alloy material on surfaces of crossed cavities which are formed internally in metal vessels to be used as component parts of petroleum and natural gas boring equipment, including valves, well head parts and the like.

2. Description of the Prior Art

Metal vessels include, for example, gate valves which have been widely used due to their high pressure sealability and easier maintenance. In this connection, there have been proposed various methods for the improvement of durability of valves of this sort, such as measures against abrasive wear caused by contact with a high velocity fluid flow containing solid particles of minerals, measures against leakage of fluid caused by thermal strains of a valve body, valve stem or packing due to a temperature difference between an ambient temperature which is, for example, $-60°$ C. at the lowest and an internally running fluid temperature which is, for example, $150°$ C. at the highest, packing methods of shutting off a maximum high pressure fluid of 2100 kg/cm$^2$, methods of maintenance for facilitating replacements of worn-out parts, and so forth. Above all, it is a matter of utmost importance to provide a counter-measure against corrosion in consideration of properties of a fluid involved.

The fluid which occurs in a gas well or an oil well generally contains $H_2S$, $CO_2$, chlorides, etc. so that it is acidic and very strong in terms of corrosiveness. In order to ensure corrosion resistance of valve components which contact a fluid of this sort under a high pressure, it has been the usual practice to select, for a major part such as a valve casing, a Cr—Mo—Ni steel which is a heat resistant steel with good castability and machinability. This kind of steel can be regarded as a corrosion resistant steel for its good corrosion resistance to a strongly oxidative acid such as nitric acid, but it is insufficient in corrosion resistance to non-oxidative acids. Accordingly, for securing a prolonged service life of a valve by improvement of its corrosion resistance along with enhancement of its resistance to abrasive wear and thermal shocks, it is necessary to provide laminated layers of high grade super alloys such as Inconel, Hastelloy, Waspalloy, Nimonic, Thetalloy, Udimet and the like on valve casing walls to be contacted with a corrosive fluid. However, integration of such high grade alloy materials into a valve casing as a whole inevitably results in high production cost and inferior cutting machinability.

The methods which are generally resorted to for the improvement of resistance to abrasive wear or corrosion of surfaces of a rigid steel structure include surfacing by welding, spraying, carburizing, nitriding, plating, explosive deposition, press-in fitting of the bushing and the like, which have respective merits and demerits. In this connection, cladding by forced press means such as rolling is also employed frequently, but it is not suitable for cladding the inner surfaces of a valve casing. Instead, a cladding method by an HIP (hot isostatic pressing) process has recently been introduced into the art (e.g., Japanese Patent Publication No. 56-156704), in which metal powder is packed into a gap spaced between a valve casing and an inner support structure and, after evacuating the inside, is put in a pressure container with a heater, sending as gas thereto from a superhigh pressure booster to produce moldings of metal powder under heated superhigh pressure conditions. This method still has a large number of problems to be solved, e.g., an increased number of steps in the manufacturing process and a high production cost, resulting from the use of the internal support structure and machining operation for removing the same subsequent to the HIP operation.

SUMMARY OF THE INVENTION

It is an object of the present invention to solve the problems of the above-mentioned conventional cladding method and, more particularly, to eliminate the necessities of uniform packing of metal powder, the provision of an internal support structure and the machining operation for removing the internal support structure after an HIP operation.

It is a further object of the invention to provide a method for cladding a corrosion resistant high alloy material on surfaces of crossed cavities in a vessel of a high strength metallic material, in which the cladding high alloy material is prefabricated into shaped structures conforming with the respective cavities in the vessel from a thin sheet of the corrosion resistant high alloy material. The prefabricated cladding structures are assembled into the crossed cavities along with auxiliary component parts, sealing the outer ends of the cladding structures and evacuating the contacting surfaces of the assembled parts to hold then in intimate contact with each other. After coalescing the clading structure and vessel by an HIP treatment under high pressure and temperature conditions, overlapped portions of the cladding structures at the intersection of the crossed cavities are removed in a final stage.

More specifically, according to one aspect of the present invention, there is provided a method for cladding inner surfaces of a vessel by the use of prefabricated cladding structures, which method is particularly suitable for lining a corrosion resistant high alloy material on inner surfaces of a vessel with crossed cavities, and comprises: prefabricating shaped cladding structures conforming with the shapes of crossed cavities in the vessel from a thin sheet of the corrosion resistant high alloy material by a forming operation or welding; providing grooves on the surfaces of the crossed cavities for receiving a corner member to be located at the joint corners of the cladding structures and end members to be located at the outer open ends of the cladding structures; assembling the cladding structures into the crossed cavities along with the corner and end members; sealing the contacting surfaces of the assembled parts by welding the end members to the vessel and cladding structures; coalescing the assembled parts and the vessel by applying a high pressure to the cladding structures at a high temperature; and removing overlapped portions of the assembled cladding structures at the intersection of the crossed cavities to communicate the same with each other.

BRIEF DESCRIPTION OF THE DRAWINGS

The above and other objects, features and advantages of the present invention will become apparent from the following description and the appended claims, taken in conjunction with the accompanying drawings which show by way of example some preferred embodiments of the invention and in which:

DESCRIPTION OF PREFERRED EMBODIMENTS

Figure 1:
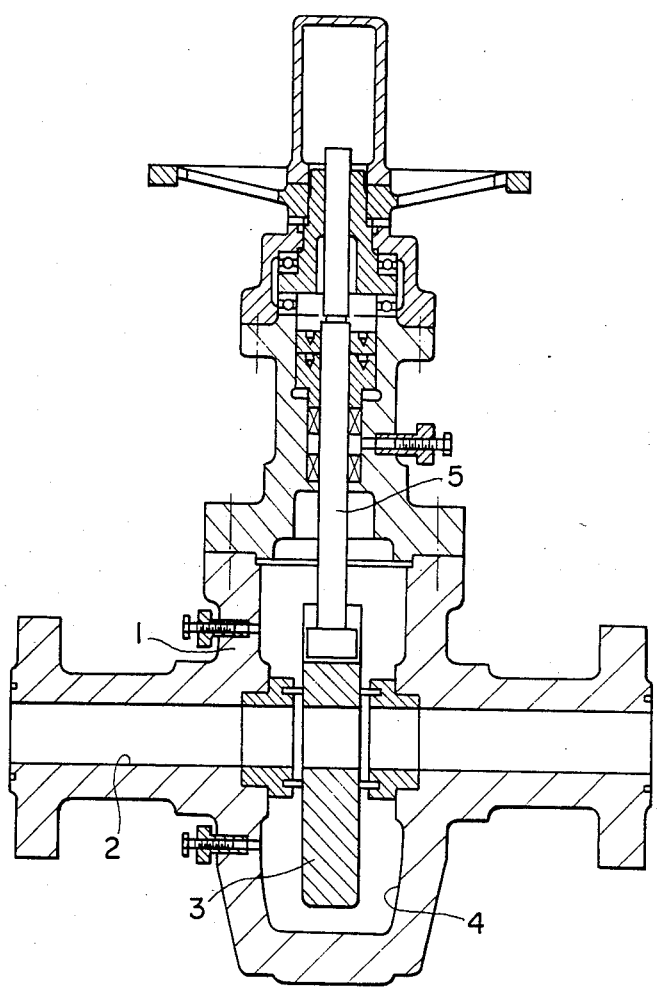
FIG. 1 is a vertically sectioned side view of a low pressure range gate valve, taken as an example of the vessel to which the invention is applicable.

Referring to the accompanying drawings and first to FIG. 1, there is shown an example of vessels to which the present invention is applicable, more particularly, a gate valve for the low pressure range. The vessel or valve casing 1 consists of an integral structure which is formed of a metallic material of high strength and internally defines a first cavity 2 providing a passage of a fluid and, in crossed relation with the first cavity 2, a second cavity 4 for receiving a valve body 3 slidably across the first cavity 2. The second cavity 4 of the valve casing 1 is formed in a pot-like shape to extend a valve stem 5 to one side thereof. In the case of a high pressure range gate valve shown in FIG. 2, the second cavity 4 is formed in a tubular shape to extend stems 5 and 5' on the opposite sides thereof.

Figure 3:
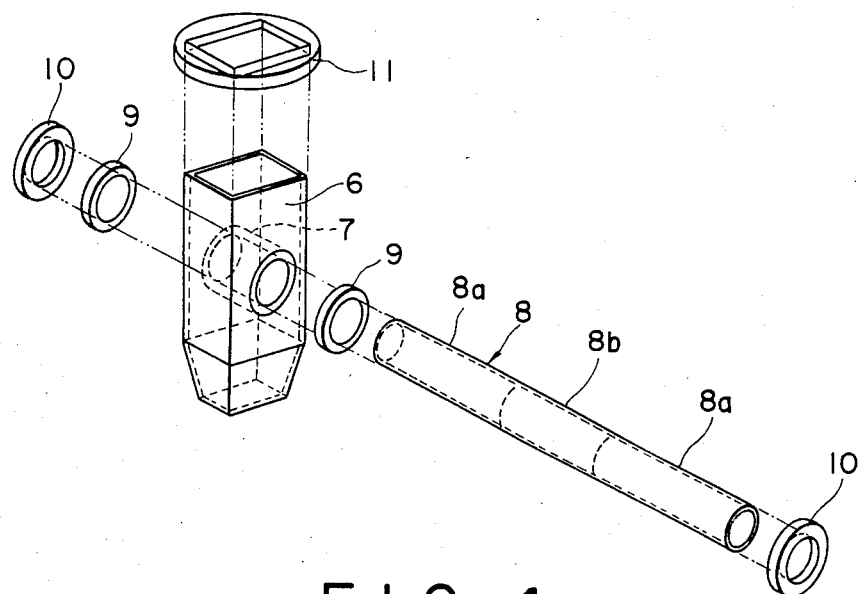
FIG. 3 is an developed perspective view of cladding structures which are employed in the present invention.

FIG. 3 shows in a developed perspective view of cladding structures prefabricated outside the vessel from a thin sheet of a corrosion resistant high alloy material in conformity with the shapes of, in this case, the crossed cavities 2 and 4 of the low pressure valve of FIG. 1.

A first cladding member 6 for the cavity 4 which serves as a valve chamber is prefabricated into a pot-like welded structure of the corrosion resistant high alloy material conforming with the shape of the cavity 4. A tubular passage 7 which is open at opposite ends is passed across and welded to an intermediate portion of the first cladding structure 6. The tubular passage 7 is so positioned and dimensioned that, in an assembled state, it can receive a second cladding structure 8 which will be described hereinbelow, occupying the intersection of the two crossed cavities.

The second cladding structure 8 is formed mainly from a high alloy material into a tubular shape conforming with the cavity 2 which serves as a fluid passage. If desired, it is possible to use an inexpensive steel for a middle section 8b of the second cladding member 8 to be fitted in the passage 7, welding tubes 8a of high alloy material to the opposite ends of the passage 7.

The high alloy material is also used for corner rings 9 and end rings 10 to be fitted on the second cladding structure 8 and for an end ring 11 to be fitted on the first cladding structure 6.

Figure 4:
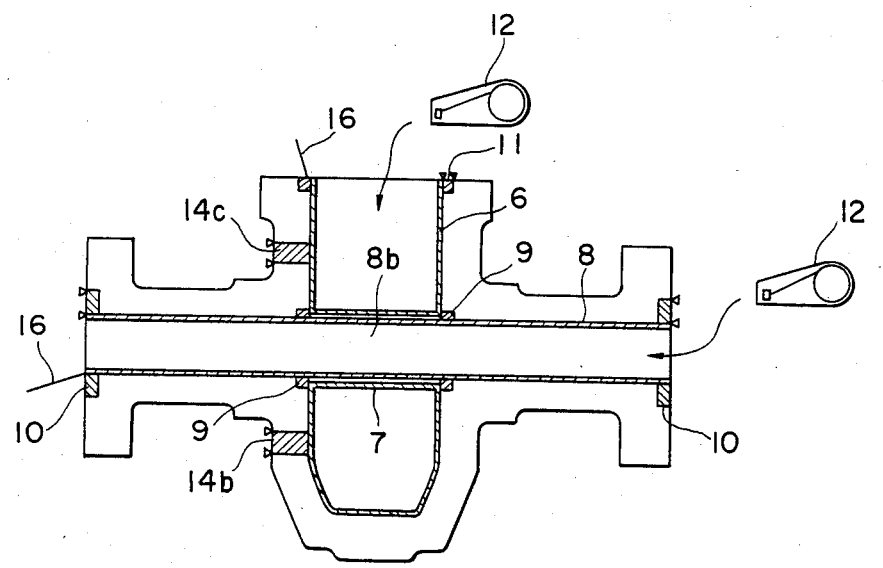
FIG. 4 is a vertically sectioned side view of the cladding structures in an assembled state.

After externally prefabricating the cladding structures, they are assembled into the vessel in the manner as shown in FIG. 4. More specifically, after placing the corner rings 9 in position, the first cladding structure 6 is inserted into the cavity 4 and then the second cladding structure 8 is inserted in the cavity 2 through the passage 7, fitting the end rings 10 and 11 on the respective cladding structures. Since the cladding structures 6 and 8 have internal dimensions corresponding to the desired internal dimensions of a finished product, the crossed cavities of the vessel 1 are, of course, formed in greater dimensions to provide the spaces for accommodating the cladding structures.

After assembling, in order to evacuate the surfaces of the cladding structures 6 and 8 in contact with the vessel 1, passage 7, end rings 10 and 11, or corner ring 9, the marginal edges of the end ring 11 in contact with the first cladding structure 6 and vessel 1 as well as the marginal edges of the end ring 10 in contact with the second cladding structure 8 and vessel 1 are sealed by welding as indicated by the symbol "Δ" in FIG. 4. Thereafter, a vacuum pipe 16 is connected to the end rings 10 and 11 to suck out residual air from all of the contacting surfaces, cutting off the pipe 16 upon estabilshing vacuum state.

To the sealed assembly thus obtained, a high pressure of 1000–2000 kg/cm$^2$ is applied, for example, by the use of argon gas at a high temperature of about 1000° C. to effect coalescence between the the base metal of the vessel 1 and the high alloy components, between contacting portions of the high alloy components, and between contacting portions of the passage 7 and the central tube section 8b. The Reference numeral 12 denotes a superhigh pressure gas sealing booster for applying a high pressure to the cladding structures 6 and 8. In this manner, the contacting surfaces are joined in an activated state by diffusion coalescence below melting points of the metals to form a strongly joined unitary body.

Figure 5:
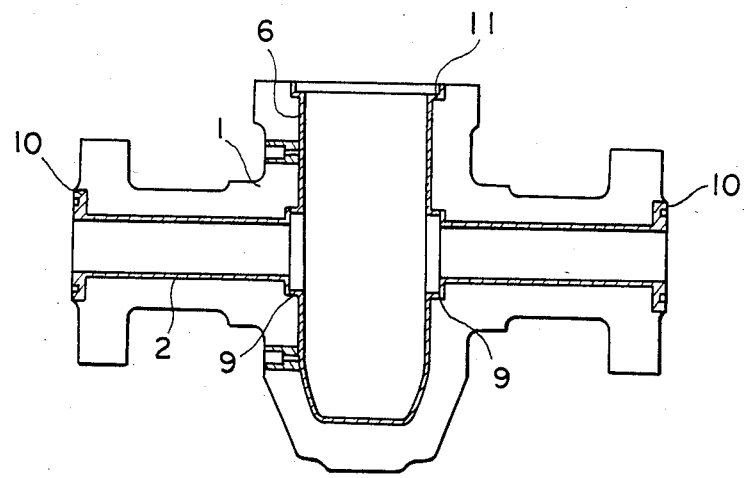
FIG. 5 is a vertically sectioned side view of a clad vessel.

After coalescence of or interconnecting the metal parts, the passage 7 and the tube section 8b at the intersection are removed to form crossed cavities which communicate with each other, followed by necessary machining operations on the corner portions and the end portions of the cavities to obtain a vessel which is internally clad with the corrosion resistant high alloy material. FIG. 5 shows a finished vessel as produced by the above-described method of the invention.

Figure 2:
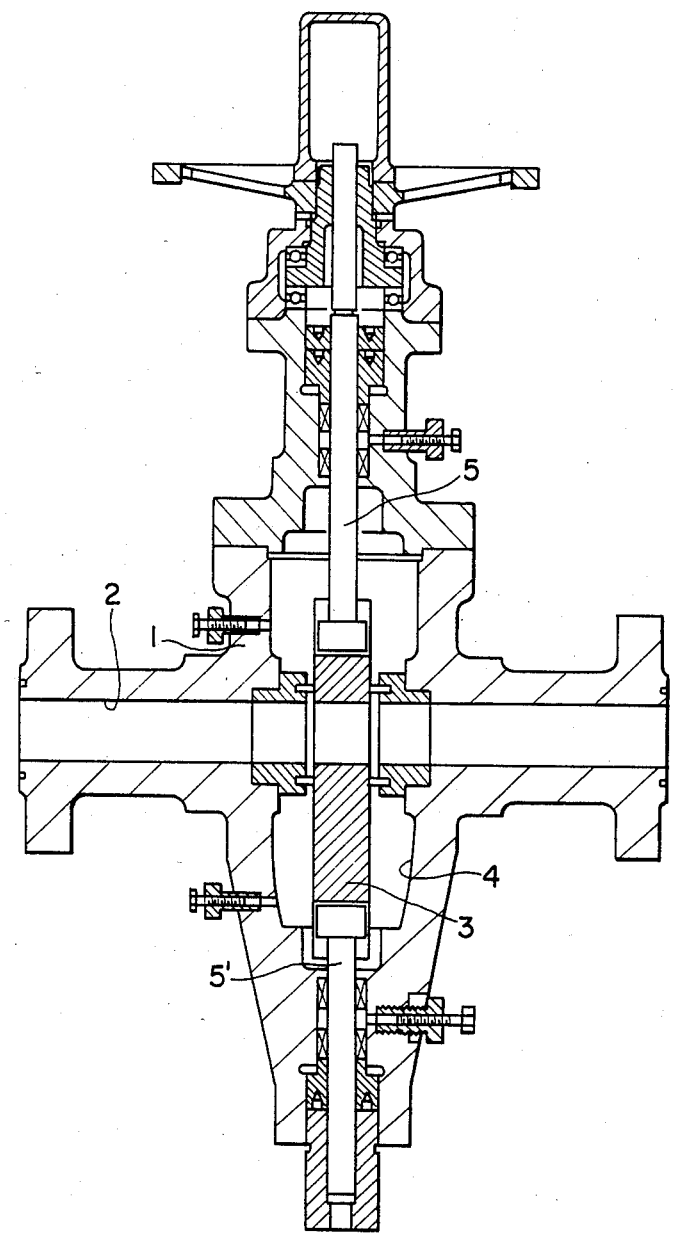
FIG. 2 is a view similar to FIG. 1 but showing a high pressure range gate valve.
Figure 6:
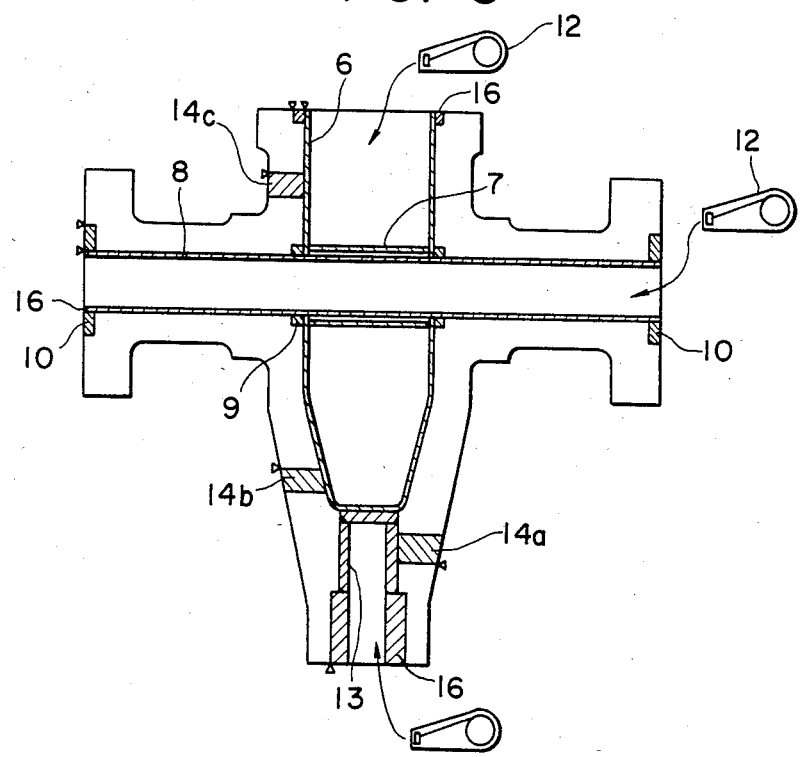
FIG. 6 is a view similar to FIG. 4 but showing another embodiment of the invention.

Referring to FIG. 6, there is illustrated another embodiment of the invention, in which a vessel with the first and second prefabricated cladding structures assembled into crossed cavities for a high pressure range gate valve as shown in FIG. 2 is treated in the same manner as in the embodiment of FIGS. 3 to 5 to seal in a vacuum state the contacting surfaces and coalescence them under high pressure and temperature conditions, except for the use of high alloy plugs 13 and 14a, 14b and 14c.

Figure 7:
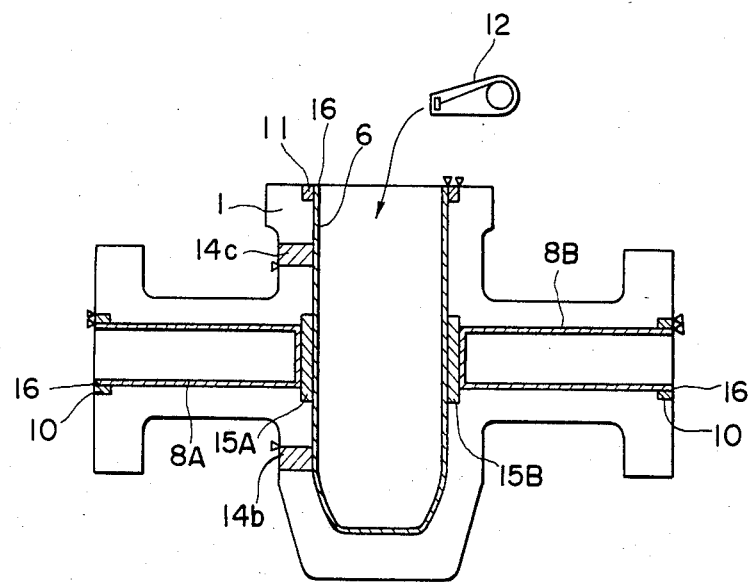
FIG. 7 is a view similar to FIG. 6 but showing still another embodiment of the invention.
Figure 8:
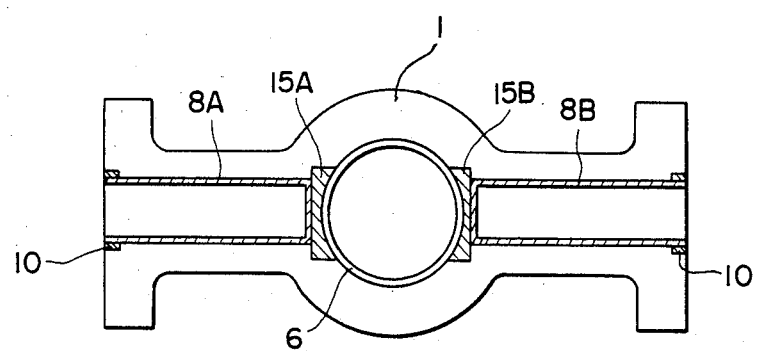
FIG. 8 is a horizontally sectional plan view of the embodiment of FIG. 7.

FIGS. 7 and 8 show another embodiment which is basically the same as the embodiments of FIGS. 3 to 6 but slightly modified in the constructions of the valve and prefabricated cladding structures. More particularly, in the embodiment of FIGS. 7 and 8, the second cladding structure which forms a fluid passage is constituted by a couple of separate tubes 8A and 8B which are closed at inner ends thereof. Therefore, in this case the first cladding structure 6 which forms a valve chamber can be freely inserted between the opposing closed ends of the split tubes 8A and 8B of the second cladding structure 8, so that there is no necessity of providing a passage 7 across the first cladding structure 6. The split tubes 8A and 8B of the second cladding structure are held in contact with the first cladding structure 6 through corner plates 15A and 15B of high alloy material. After sealing the contacting surfaces of the assembled parts and coalescing or interconnecting them under high pressure and temperature conditions, the inner ends of the split tubes 8A and 8B are opened to communicate with each other and with the first cladding structure 6. With regard to other parts of the valve which are common to the foregoing embodiments, such are designated by the same reference numerals and their description is omitted to avoid unnecessary repetitions.

It will be understood from the foregoing description that, according to the present invention, the cladding high alloy material can be accurately prefabricated into a suitable shape in a facilitated manner and can be applied to various vessels as long as the cavities have a shape which permits insertion of a prefabricated cladding structure. The passage 7 and the section 8a of the second cladding structure 8 which are to be removed in a final stage subsequent to the coalescence or interconnection of metals may be formed of an ordinary steel to reduce use of the expensive high alloy to a minimum necessary amount. Further, the corner members and end rings which are used for sealing purposes can be simultaneously joined to form integral part of the vessel, coupled with an effect of enhancing the homogeneity of the corrosion resistant clad layer.

Obviously, numerous modifications and variations of the present invention are possible in light of the above teachings. It is therefore to be understood that within the scope of the appended claims, the invention may be practiced otherwise than as specifically described herein.

What is claimed is:

1. A method for cladding a corrosion resistant high alloy material on surfaces of crossed cavities in a vessel of a high strength metallic material, which comprises:
   prefabricating first and second cladding structures of generally tubular shapes conforming with the crossed cavities from a thin sheet of a high alloy material.
   providing interior and exterior grooves on the surfaces of said cavities;
   positioning corner members of a high alloy material in said interior grooves so as to be located at joint corners of said first and second cladding structures at an intersection of said crossed cavities;
   positioning end members of a high alloy material in said exterior grooves so as to be fitted on end portions of said cladding structures;
   assembling said first and second cladding structures, corner members and end members into said crossed cavities;
   sealing contacting surfaces of the assembled parts by welding said end members to said vessel and cladding structures;
   evacuating the contacting surfaces of said vessel, first and second cladding members, corner members and end members after sealing;
   applying a high pressure to said cladding structures at a predetermined temperature so as to interconnect the assembled parts and the vessel; and
   removing overlapped portions of the cladding structures at the intersection of said crossed cavities to communicate the latter with each other.

2. A method as set forth in claim 1, which further comprises providing a passage across one of said first cladding structures for receiving an intermediate section of said second cladding structure in the assembling stage and removing said passage and intermediate section after coalescence of the assembled parts.

3. A method as set forth in claim 2, wherein said passage and intermediate section of said cladding structure are formed of steel.

4. A method as set forth in claim 2, wherein said vessel further comprises a casing of a low pressure range gate valve.

5. A method as set forth in claim 2, wherein said vessel further comprises a casing of a high pressure range gate valve.

6. A method as set forth in claim 1, wherein said corner and end members are in a ring-like form and which further comprises fitting said corner and end members on joined corners and outer ends, respectively, of said first and second cladding structures.

7. A method as set forth in claim 1, wherein said first cladding structure further comprises a pair of separate tubes closed at inner ends and assembled into one of said crossed cavities with the closed inner ends in abutting engagement and in longitudinal alignment with the opposite lateral sides of said second cladding structure through said corner members.

* * * * *